Figure 1:
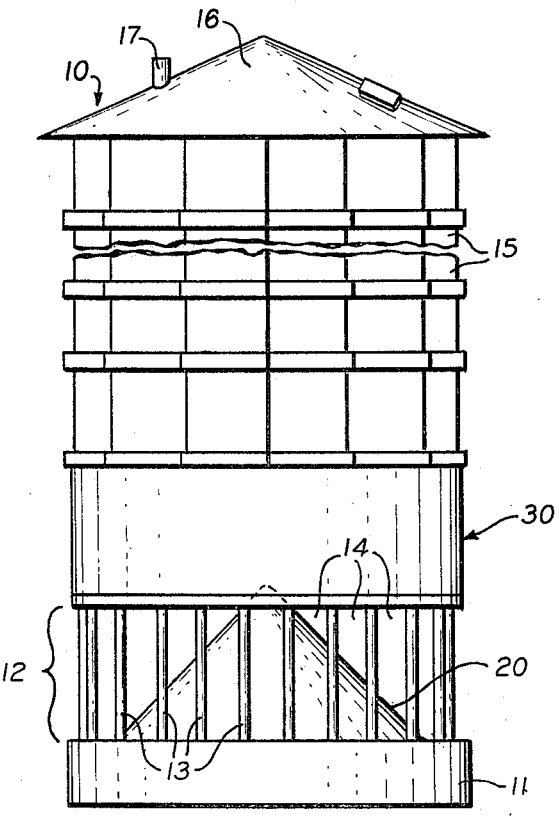

Nov. 29, 1966 — M. E. SINGLEY — 3,288,111
SILAGE FEEDING
Filed Sept. 28, 1964

INVENTOR
MARK E. SINGLEY

BY

ATTORNEY.

United States Patent Office 3,288,111
Patented Nov. 29, 1966

3,288,111
SILAGE FEEDING
Mark E. Singley, Belle Mead, N.J., assignor to Fiddler's Creek Foundation Inc., New York, N.Y., a corporation of Delaware
Filed Sept. 28, 1964, Ser. No. 399,786
3 Claims. (Cl. 119—52)

This invention relates to the art of silage feeding, more particularly to an improved silo, and method for utilizing same to implement the feeding of silage from a silo, whereby the rate of feed of silage is controlled by the rate of removal of the silage from a discharge opening of the silo.

Contemporary farm economics have given rise to a need for reducing handling requirements of animal feeds. As a result, it is found desirable to employ techniques for feeding silage to an animal in which the rate of feeding is automatically controlled by the needs of the animal. So called self-feeding silos have been evolved in which the cattle, or other animals, are automatically provided with the stored forage in response to the rate of feeding of the animal. Such self-feeder structures are of two types. Either the cattle consume their way through the stored forage which remains stationary, or the cattle feed from a fixed position and the stored forage is moved to the animal. The first type of self-feeder structure is usually a flat storage structure, while the second type is a vertical structure of the conventional silo type. Where the silo type of vertical structure is employed, the space requirements are reduced, and undesired movement of the animal is minimized. Problems are however engendered in the use of these self-feeding silos in that the relatively high mass of silage contained within the silo structure tends to become compacted particularly at the lower end of the silo, as a result of which the feeding of the silage mass is prevented.

It is with the above problems and desiderata in mind that the present means including both method and apparatus have been evolved, means implementing the use of a silo for self-feeding of forage from the silo in response to the feeding demands of an animal.

It is accordingly among the primary objects of this invention to provide improved self-feeding silage means.

Another object of the invention is to provide improved means implementing the feeding of silage from a relatively high silage mass.

A further object of the invention is to provide an improved silo in which necessary fracturing of the silage mass takes place adjacent the discharge openings of the silo so as to ensure free passage of the silage mass through the discharge opening in response to the removal of silage through the discharge opening.

A further object of the invention is to provide an improved method for ensuring fracturing of the silage mass to overcome any compacting effect resulting from the weight of the silage on the lower portions thereof.

These and other objects of the invention which will become hereafter apparent are achieved by forming a silo having side walls between which a silage mass is enclosed, and having an opening at the lower end from which the silage may be removed. The opening is of a size such as to permit the discharge of any desired quantity of silage such as is necessary to feed the animals in response to their demands, at the site of the opening. Since these openings are at the lower end of the silo, the weight of the silage contained within the silo above the openings acts to compact the mass of silage interfering with the free passage of silage through the discharge openings. In order to obviate the undesired compacting effects, the silage mass must be fractured. This is accomplished in accordance with the instant invention by providing a plurality of tiered baffles arranged one over the other on the interior surface of the silo side walls. The baffles are formed with surfaces lying along an inclined plane, the lower end of which extends into the silage mass, and the upper end of which is contiguous with the interior surface of the silo side wall. As the silage mass moves down this inclined plane there is increased compacting of the mass. However, at the end of the inclined plane, there is a relaxing of compacting pressure which produces fracturing of the mass. In order to ensure desired fracturing of the silage mass, a second set of baffles of a similar inclined plane configuration is arranged beneath the upper tier of baffles and the compressive and relaxing forces previously described are repeated. The second or lower set of baffles extend further into the silage mass than did the upper tier of baffles, as a result of which a jolting action is provided on the silage mass as it moves downwardly in the silo.

A feature of the invention resides in the fact that the stepped baffles through statically positioned with respect to the silo have a dynamic fracturing effect on the relatively moving silage mass.

Another feature of the invention resides in the fact that these static baffles are not subject to deterioration, nor the maintenance problems conventionally encountered in connection with moving components.

Figure 2:
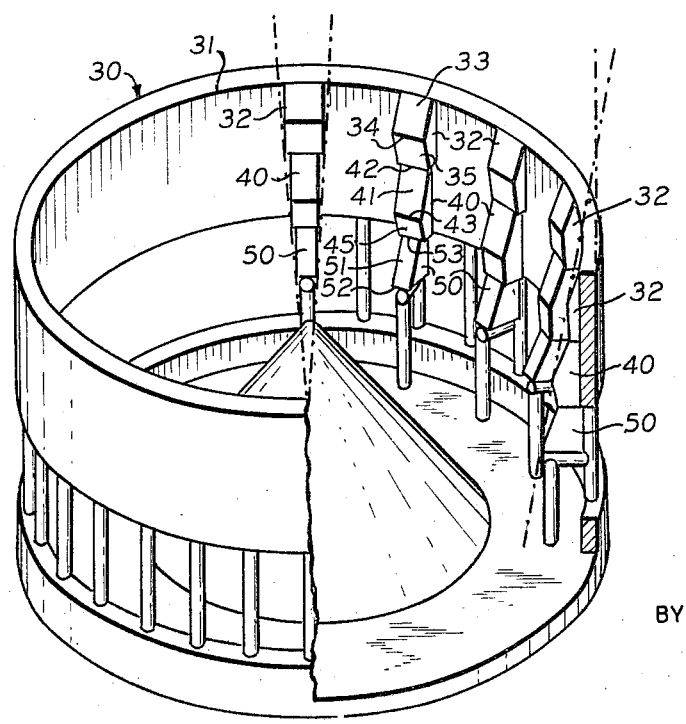

The specific details of a preferred embodiment of the invention, and their mode of functioning, will be made most manifest and particularly pointed out in clear, concise, and exact terms in conjunction with the accompanying drawings, wherein:

FIG. 1 is a schematic elevational view of a silo formed in accordance with the teachings of this invention; and FIG. 2 is a schematic perspective view through the lower end of a silo with parts broken away to reveal the details of a preferred embodiment of the fracturing baffles.

Referring now more particularly to the drawings, like numerals in the various figures will be employed to designate like parts.

As best seen in FIG. 1, the novel silo 10 is seen to comprise a foundation 11 preferably formed of concrete or the like, an open base 12 having struts 13 at circumferentially spaced intervals thereabout to provide silage discharge openings 14 therebetween. A hollow cylindrical storage chamber 15, capped by conical roof 16 provided with relief valve 17 forms the structure as seen.

A cone 20 such as shown at the bottom of FIG. 1 may be arranged within the silo to aid in deflecting the released silage from the storage chamber 15 to the feeding area adjacent struts 13.

The silo side walls may be constructed in accordance with standard silo construction techniques employing either wooden staves, concrete staves or the like, the particular silo construction technique forming no part of this invention. Arranged at the lower end of the storage chamber 15 defined by the silo side walls is a baffle section 30, as best seen in FIG. 2. Baffle section 30 may be formed of any of a variety of materials, either fabricated of metal, or cast from concrete, or fabricated of wood. An exterior band 31 dimensioned like that of the cross section of the silo 15 is arranged to support the side walls of the silo, and form a part thereof. On the interior surface of band 31, an upper tier of baffles 32 is formed.

The baffles 32 of the upper tier are contoured to have a downwardly inclined plane surface 33, the upper end of which lies along the interior surface of the silo side wall, and the lower end 34 of which projects into the silage mass from the silo side wall. Extending downwardly from the leading edge 34 of baffle 32 is a plane 35 which is downwardly inclined away from the center of the silage mass. A second tier of baffles 40 is arranged beneath the first tier of baffles 32 formed with a downwardly inclined plane 41 an upper edge 42 adjacent the end of plane 35, at a slightly spaced distance inwardly of the side wall of the silo. The lower edge 43 of plane 41 extends inwardly from the side wall of the silo a distance further than the lower inwardly extending edge 34 of plane 33 of upper baffle 32. A reversely inclined plane 45 extends downwardly from the inner edge 43 of plane 41 away from the center of the silo towards the silo side wall.

In the illustrated embodiment, a third tier of baffles 50 is provided having a downwardly and inwardly inclined surface 51, the lower end 52 of which extends away from the silo side wall, and the upper end 53 of which is coextensive with the lower end of plane 45, as seen in FIG. 2.

It is preferred that each lower tier of baffles be less in width than its immediately higher tier. Thus, as seen in the center of FIG. 2, the upper tier of baffles 32 is greater in width than the intermediate tier of baffles 40 which is greater in width than the lower tier of baffles 50.

Further as seen to the right in FIG. 2 each progressively lower tier of baffles extends further towards the center of the silage mass. Thus, lower baffles 50 have a point extending further into the silage mass than intermediate tier of baffles 40 which extend further into the silage mass than upper tier of baffles 32.

Operation

The aforedescribed silo structure may be employed to implement the feeding of silage from a silo by ensuring the fracturing of the silage mass at the lower ends of the silo to implement discharge of the silage through the discharge openings.

In use, as the silage mass moves downwardly in the silo, either under the control of devices such as shown in U.S. Patent 3,126,872 or 2,988,046, the compacted silage mass in the lower end of the silo is fractured as a result of its passage over the baffles.

The upper tier of baffles 32 exert a compressive force on the silage mass which is suddenly released as the silage mass passes over the leading edge 34 of inclined plane 33. This release of pressure appears to produce a change in dynamic inertia of the moving mass which starts a disrupting influence on the compacted mass. In contacting the lower set of baffles 40, the expansion permitted by reversely inclined plane 35 of upper baffles 32 is reversed, and the silage mass is again compacted, and subsequently the compacting pressure is again released as the silage mass passes over leading edge 43 of baffles 40. This process is again repeated at lower baffles 50.

It has been empirically determined that the use of three baffles suffice for the fracturing of most types of forage. Obviously the number of baffles may be changed to accommodate different silage conditions. The inventive concept involves the fact that by the utilization of baffles which are static with respect to the silo structure, a dynamic exertion of force on a silo mass may be obtained serving to fracture the mass and implement its discharge through the discharge openings of a silo to permit self-feeding of the silage.

The above disclosure has been given by way of illustration and elucidation, and not by way of limitation, and it is desired to protect all embodiments of the herein disclosed inventive concept within the scope of the appended claims.

What is claimed is:

1. In a silo having side walls enclosing a silage mass, and having a silage discharge opening at the lower end thereof, a plurality of silage fracturing baffles, said baffles comprising: an upper tier of spaced baffles, each having a downwardly inclined plane surface, the upper end of which lies adjacent the interior surface of the side walls of the silo, and the lower edge of which extends into the silage mass; a second lower tier of spaced baffles, each of which has an inclined plane, the upper end of which is closer to the side walls of the silo than the lower end of the inclined plane of the upper baffles, and the lower end of which extends further into the silage mass than the lower end of the inclined plane of the upper baffles, whereby the silage mass in moving past said baffles is periodically subject to a compressive and relaxing force.

2. In a silo as in claim 1, the baffles of the upper tier being wider than the baffles of the lower tier.

3. In a silo as in claim 1 in which a reversely inclined plane is formed between the lower edge of the inclined plane of each baffle, said reversely inclined plane extending between the innermost lower edge of said first mentioned inclined plane and the upper outer edge of an adjacent inclined plane.

References Cited by the Examiner
UNITED STATES PATENTS

| | | | |
|---|---|---|---|
| 1,301,051 | 4/1919 | Hart | 119—51 |
| 3,126,872 | 3/1964 | Magur | 119—52 |

SAMUEL KOREN, *Primary Examiner.*

HUGH R. CHAMBLEE, *Examiner.*